Nov. 7, 1933.  W. K. HAWKS  1,933,905
VALVE FOR LUBRICATING SYSTEMS
Filed Sept. 10, 1931
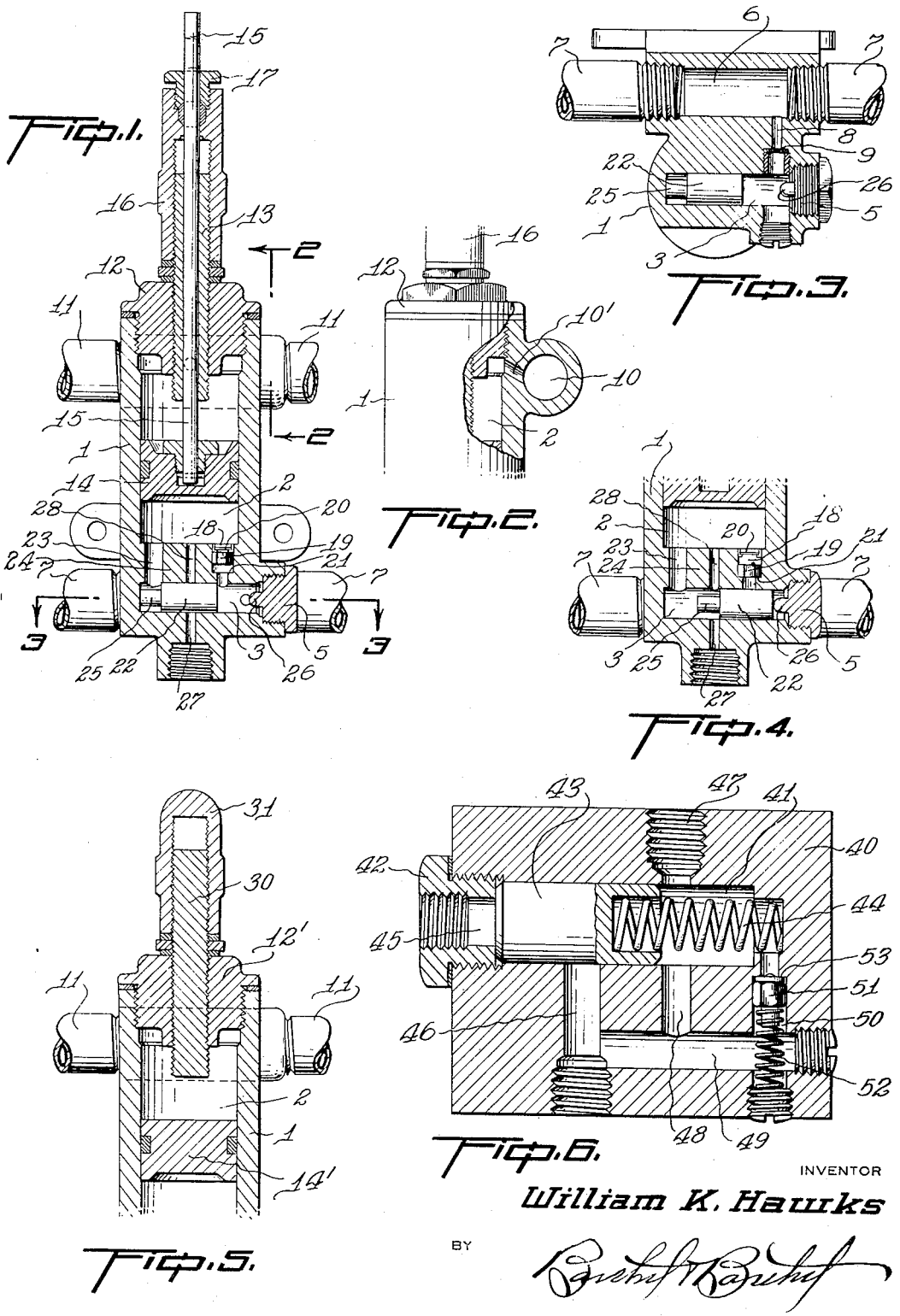
INVENTOR
*William K. Hawks*
BY
ATTORNEYS Patented Nov. 7, 1933

1,933,905

UNITED STATES PATENT OFFICE 1,933,905

VALVE FOR LUBRICATING SYSTEMS

William K. Hawks, Battle Creek, Mich., assignor, by mesne assignments, to The Farval Corporation, Cleveland, Ohio, a corporation of Ohio Application September 10, 1931
Serial No. 562,071

7 Claims. (Cl. 184—7)

The present invention pertains to a novel valve for lubricating systems of the general type shown in the copending applications of Leonard R. Kerns, Serial No. 341,958, filed February 23, 1929, and Serial Nos. 484,332 and 484,333, filed September 25, 1930.

This system of lubrication embodies a measuring valve associated with each bearing and operated in two directions either by two pressure sources or a single pressure source. This valve is so constructed as to form fluid paths alternately in two different directions for loading and discharging. A pressure actuated movable element in the valve determines the pressure paths.

Whether the valve is actuated by two pressure sources or a single pressure source, there is present the difficulty of effectively obstructing one of the pressure paths by the movable element of the valve when the other path is open, particularly in view of the fact that this element requires a sliding fit in order to shift from one position to the other.

The object of the present invention is to overcome this difficulty and is accomplished by means of a bypass connection between the two paths formed in such a manner that pressure in one of the paths acts laterally on the movable member to hold it firmly against a port comprised in the other path, whereby the latter path is effectively sealed by the action of the pressure in the former path to prevent seepage around the movable element from one path to the other.

The invention is fully disclosed by way of example in the following description and in the accompanying drawing, in which—

Figure 1 is a longitudinal section of the device in loading position;

Fig. 2 is a section on the line 2—2 of Figure 1;

Fig. 3 is a section on the line 3—3 of Figure 1;

Fig. 4 is a detail section in the same plane as Fig. 1, and showing the device in discharging position;

Fig. 5 is a detail longitudinal section of a valve having a modified form of regulator; and Fig. 6 is a sectional view of a modified form of valve.

Reference to these views will now be made by use of like characters which are employed to designate corresponding parts throughout.

As shown more clearly in Figures 1, 2, 3 and 4, the valve comprises a body 1 of hollow cylindrical formation, the interior 2 of which may be identified as a loading or measuring chamber. In the base of the body is formed a transverse control valve chamber 3 closed at one end by the wall of the body and at the other end by a plug 5. In the same transverse plane with the chamber 3 is a lubricant supply passage 6 having its ends connected into a lubricant supply line 7. A passage 8 connects the passage 6 to the chamber 3, with a strainer 9 inserted therein. The lubricant supplied from the line 7 is that which is to be delivered to the bearings and is usually a grease.

Over the passage 6 is formed a similar boss defining a passage 10 connected to the upper part of the chamber 2 by a port 10' and adapted to have its ends connected into a line 11 which supplies fluid under pressure for operating the valve. This fluid is preferably an oil and is not intended to be delivered to the bearings.

The upper end of the body 1 is closed by a cap 12 in which is adjustably threaded a stop member 13. The chamber 2 contains a piston 14 having a stem 15 extending through the stop 13. The outer end of the stop is enclosed in a cap 16 threaded thereon, and the upper end of the cap in turn carries a packing nut 17 also having the stem 15 passing therethrough for a purpose which will presently appear.

The lubricant supply to the chamber 3 is delivered to the loading chamber 2 by a port 18 connecting the chambers. In the port is mounted a check valve in the form of a hexagonal plug 19, which is stopped but held open by a cage 20 when there is a flow from the chamber 3 to the chamber 2. When there is flow or pressure in the opposite direction, the member 19 closes the passage 18 by resting on a seat 21 therein.

The chamber 3 contains a control valve in the form of a piston valve 22 having a sliding fit therein. This valve is adapted to obstruct communication between the chamber 3 and intake port 18 as will presently appear. An outlet port 23 is drilled through the partition 24, between the chambers 2 and 3, and is so positioned as to remain unobstructed whether the piston valve 22 covers or uncovers the intake port 18. This relation is maintained, when the piston valve approaches the port 23, by a reduced end 25 on the piston valve and adapted to engage the blind end of the chamber 3. In like manner, a reduced inner end 26 of the plug 5 prevents obstruction of the passage 8 in the other position of the piston valve.

In the operation of the device as thus far described, the loading chamber 2 is filled with lubricant beneath the piston by pressure in the line 7. When the piston has reached its upper limit, pressure is relieved in the line 7 and applied in the line 11, whereupon the piston 14 is moved towards the partition and the piston valve 22 against the stop 26 to close the port 18 as shown in Figure 4. The base of the body 1 is further formed with an outlet port 27 extending from the chamber 3 and adapted for connection to a bearing, and in the last mentioned movement to the piston 14, the lubricant previously loaded into the chamber 2 is expelled through the port 27 which is positioned to be uncovered at this time as also shown in Figure 4.

Opposite the port 27, the partition 24 is formed with still another port 28 connecting the chambers 2 and 3 and preferably directly opposite, or coaxial with, the port 27. During the operation of loading the chamber 2, it is obviously desirable that the piston valve 22 perfectly seal the port 27 from the chamber 3, but considerable difficulty has occurred in this connection because of the sliding fit which the piston valve 22 must have in the chamber 3 in order to shift readily. This difficulty, however, is overcome by the port 28 which transmits the loading pressure from the chamber 2 laterally against the piston valve 22 in such a manner as to hold the latter against the port 27 as a result of the aforementioned relation of the ports 27 and 28.

The volume of lubricant to be delivered by the valve is measured by the stroke of the piston 14 which may be regulated by adjustment of the stop 13 in the head 12. The adjustment is fixed by screwing the cap 16 firmly against the head 12. The actual length of the stroke while the device is operating may be seen by observing the movement of the outer end of the stem 15.

A somewhat modified form of stroke regulator is shown in Figure 5 wherein the threaded stop 30 screwed through the head 12' is solid and the piston 14' has no stem. The stop 30 is adjusted in the manner already described, and the adjustment is secured by a cap 31 screwed on the exposed end of the stop and tightened firmly against the head 12'. In adjusting the screw in either embodiment, the cap is first removed and the screw set, after which the adjustment is secured by tightening the cap as described.

In Figure 6 is shown a modified construction wherein a single source of fluid pressure is employed rather than the two sources used with the device already described. The single source in this case is the pressure applied on the lubricant which is to be delivered to the bearings. The device includes a block or body 40 having a control valve chamber 41, fitted at its intake end with a coupling 42 adapted for connection to a lubricant supply source under pressure. A piston valve 43 is slidably mounted in the chamber and is normally moved towards the coupling 42 by a compressed spring 44 inserted between the valve and the blind end of the chamber 41, whereby to obstruct the intake port 45 constituted by the coupling.

An outlet port 46 is formed in the body in communication with the chamber 41 and is so located as to be opened to the chamber and port 45 when the piston valve 43 is moved under pressure in the port 45. The port 45 is connected to a source of lubricant under pressure, such as a lubricant pump drawing from a reservoir, and port 46 is connected to one or more bearings through the medium of measuring valves which close after having discharged a predetermined quantity of lubricant. At this point in the operation, the closing of the measuring valves may be felt by the increasing pressure on the lubricant supply source, and this is an indication that the pressure on the source is to be relieved.

The body 40 has a return or relief port 47 adapted for connection to a reservoir and connected to the chamber 41 and so positioned as to be open to the chamber when the supply pressure in the port 45 is relieved, as illustrated in Figure 6, and to be obstructed by the piston valve 43 when pressure is developed in the port 45. Another port 48 is provided in the body to communicate with the chamber 41 and is positioned opposite the port 47, preferably in axial alignment therewith. The port 48 is permanently in communication with the port 46 through a bypass 49 which also is connected to the blind end of the chamber 41 by a passage 50. This passage contains a check valve 51 supported on a spring 52 and positioned to close against a seat 53 by an overbalancing pressure in the bypass 49 in the direction towards the chamber 41.

The part of chamber 41 behind piston valve 43 may be filled through the port 47 under a slight pressure in the reservoir or by a pressure head on the fluid in the reservoir. In order to deliver lubricant to the line connected with the port 46 and thus to the measuring valves and bearings, pressure is applied on the lubricant supply which is connected to the coupling 42, but in such a manner as to avoid a similar pressure in the port 47. The piston valve 43 is thus moved against the action of the spring to close the ports 47 and 48 and open the port 46 to the port 45. During this movement, any lubricant confined between the piston valve 43 and the blind end of the chamber 41 is placed under pressure to open the valve 51 and is thus delivered to the bypass 49 and port 46. The piston valve 43 uncovers port 46 thus connecting the port 45 to the line and operating the previously mentioned measuring valves. Pressure obviously exists in the bypass 49 and port 48, thereby holding the piston valve 43 firmly against the port 47 to prevent leakage from the port 45 around the piston to port 47 and the reservoir, in substantially the manner described with reference to the ports 28 and 27 of Figure 1.

When the pressure in the port 45 is relieved, there is sufficient displacement of lubricant or seepage around the piston valve 43 to permit the latter to return under the action of the spring 44, opening ports 48 and 47 so that the trapped pressure in the line may be relieved through the bypass 49, port 48, chamber 41 and port 47 to the reservoir connected to port 47.

The check valve 51 may be omitted, especially in the handling of heavy lubricants, to deliver the charging pressure to the spring-engaged end of the piston valve 43, thus insuring more rapid transfer of the piston to uncover the relief port 47 when the pressure in port 45 is relieved.

Although specific embodiments of the invention have been illustrated and described, it will be understood that various alterations in the details of construction may be made without departing from the scope of the invention as indicated by the appended claims.

What I claim is:—

1. In a measuring valve, a body having a measuring chamber, a piston slidable in said chamber, a stop passing through one end of said cylinder and adapted for adjustment therein and for engagement by said piston, a stem extending from said piston and passing slidably through said stop, and a cap threaded on said stop and adapted to occupy a fixed position relatively to said body, said stem passing also through said cap.

2. In a two-way valve wherein flow is to be directed in two different paths, a body having a valve chamber and two ports communicating with the chamber and establishing two different flow paths, a piston valve slidable in said chamber to uncover either port to the exclusion of the other in different positions, pressure means operable on one end of the said piston valve for moving the same in one direction, said chamber having a supply port opening against the other end of said piston valve and adapted for communication with one of said ports when uncovered by said piston valve, said body being formed with a passage extending from the last named port to said chamber at a point opposite the other port, whereby an overbalancing pressure in said supply port causes the piston valve to uncover the port from which said passage extends and to place the uncovered port and passage in communication with said supply port, so that such pressure is communicated through the uncovered port and passage to hold the piston valve against the remaining or obstructed port.

3. In a two-way valve wherein flow is to be directed in two different paths, a body having a valve chamber and two ports communicating with the chamber and establishing two different flow paths, a piston valve slidable in said chamber to uncover either port to the exclusion of the other in different positions, pressure means operable on one end of the said piston valve for moving the same in one direction, said chamber having a supply port opening against the other end of said piston valve and adapted for communication with one of said ports when uncovered by said piston valve, said body being formed with a passage extending from the last named port to said chamber at a point opposite the other port, whereby an overbalancing pressure in said supply port causes the piston valve to uncover the port from which said passage extends and to place the uncovered port and passage in communication with said supply port, so that such pressure is communicated through the uncovered port and passage to hold the piston valve against the remaining or obstructed port, and a check valve between said chamber and passage and adapted to close by pressure in the passage toward the chamber.

4. In a two-way valve wherein flow is to be directed alternately in two different paths, a body formed to provide a loading chamber and a valve chamber with a partition therebetween, said partition having an intake port connecting said chambers, intake means to said valve chamber, outlet means from said loading chamber to said valve chamber, outlet means from said valve chamber, said partition having a port opposite the last named outlet means, and a piston valve slidable in said valve chamber and having its ends respectively exposed to said intake means and the first named outlet means, means for producing pressure alternately in the first named intake means and outlet means, said piston valve being dimensioned to open said intake port and obstruct said last named outlet means and the other port in one position and to close said intake port and connect both outlet means in another position, and means for establishing a pressure differential between the ends of said piston valve by pressure in said outlet means.

5. In a two-way valve wherein flow is to be directed alternately in two different paths, a body formed to provide a loading chamber and a valve chamber with a partition therebetween, said partition having an intake port connecting said chambers, intake means to said valve chamber, outlet means from said loading chamber to said valve chamber, outlet means from said valve chamber, said partition having a port opposite to and in alignment with the last named outlet means, means for producing pressure alternately in the first named intake means and outlet means, and a piston valve slidable in said valve chamber and having its ends respectively exposed to said intake means and the first named outlet means, said piston valve being dimensioned to open said intake port and obstruct said last named outlet means and the other port in one position and to close said intake port and connect both outlet means in another position, and means for establishing a pressure differential between the ends of said piston valve by pressure in said outlet means.

6. In a two-way valve wherein flow is to be directed alternately in two different paths, a body formed to provide a loading chamber and a valve chamber with a partition therebetween, said partition having an intake port connecting said chambers, intake means to said valve chamber, outlet means from said loading chamber to said valve chamber, outlet means from said valve chamber, said partition having a port opposite the last named outlet means, means for producing pressure alternately in the first named intake means and outlet means, a piston valve slidable in said valve chamber and having its ends respectively exposed to said intake means and the first named outlet means, said piston valve being dimensioned to open said intake port and obstruct said last named outlet means and the other port in one position and to close said intake port and connect both outlet means in another position, and a check valve in said intake port and adapted to open by pressure in said port in the direction towards said loading chamber.

7. In a two-way valve wherein flow is to be directed in two different paths, a body having a valve chamber and two ports communicating with the chamber and establishing two different flow paths, a piston valve slidable in said chamber to uncover either port to the exclusion of the other in different positions, pressure means operable on one end of the said piston valve for moving the same in one direction, said chamber having a supply port opening against the other end of said piston valve and adapted for communication with one of said ports when uncovered by said piston valve, said body being formed with a passage extending from the last named port to said chamber at a point opposite the other port, whereby an overbalancing pressure in said supply port causes the piston valve to uncover the port from which said passage extends and to place the uncovered port and passage in communication with said supply port, so that such pressure is communicated through the uncovered port and passage to hold the piston valve against the remaining or obstructed port, and means for establishing a pressure differential between the ends of said piston valve on operation of said pressure means.

WILLIAM K. HAWKS.